Jan. 18, 1966   J. CHERVENAK   3,230,502
SINGLE AIR GAP UNDERWATER TRANSDUCER ARRAY
Filed Oct. 11, 1961   4 Sheets-Sheet 1

INVENTOR
JOHN CHERVENAK
BY
ATTORNEY

Jan. 18, 1966  J. CHERVENAK  3,230,502
SINGLE AIR GAP UNDERWATER TRANSDUCER ARRAY
Filed Oct. 11, 1961  4 Sheets-Sheet 2

INVENTOR
JOHN CHERVENAK
BY
ATTORNEY

Jan. 18, 1966   J. CHERVENAK   3,230,502
SINGLE AIR GAP UNDERWATER TRANSDUCER ARRAY
Filed Oct. 11, 1961   4 Sheets-Sheet 3

INVENTOR
JOHN CHERVENAK
BY John E. Holford, Agent
Richard A. Reed
ATTORNEY

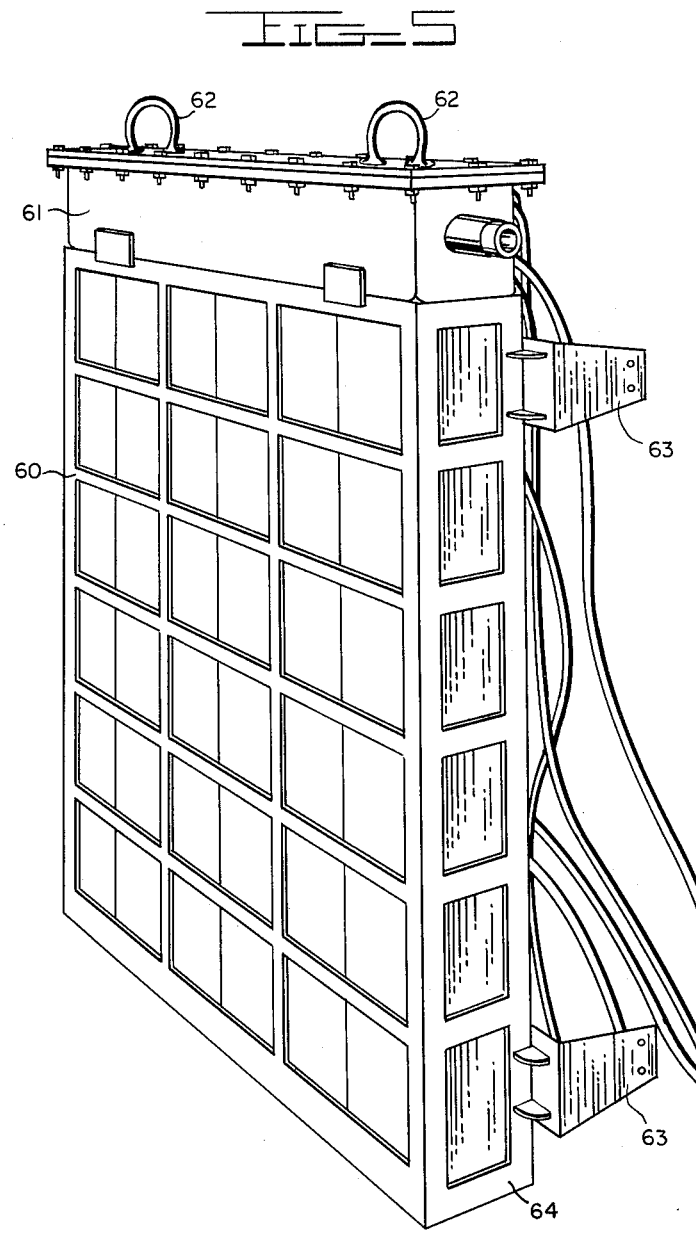

United States Patent Office 3,230,502
Patented Jan. 18, 1966

3,230,502
SINGLE AIR GAP UNDERWATER TRANSDUCER ARRAY
John Chervenak, Oxon Hill, Md., assignor to the United States of America as represented by the Secretary of the Navy
Filed Oct. 11, 1961, Ser. No. 144,517
5 Claims. (Cl. 340—9)
(Granted under Title 35, U.S. Code (1952), sec. 266)

The invention described herein may be manufactured and used by or for the Government of the United States of America for governmental purposes without the payment of any royalties thereon or therefor.

The present invention relates to single air gap electromagnetic transducers of the variable reluctance type. More particularly it relates to transducers for the efficient generation of sound at low frequencies and deep submergence in seawater or for applications in which vibratory motions are to be generated or sensed.

A number of transducers have been proposed for the generation of low frequency sound in water. Piezoelectric and magnetostrictive transducers of small size and high power-handling capacity in general can be ruled out on the basis of small amplitude of longitudinal vibration (and thus low power) for loaded rod devices or low power for the relatively small volume of active material required for flexural vibrations which may be of larger amplitude. Electromagnetic devices have been used with considerable success.

One type of variable reluctance electromagnetic transducer which has proved useful utilizes a diaphragm for a radiating face. The electric motor for this transducer comprises an electromagnetic circuit in two parts which are separated by an air gap. One part is usually attached to a very heavy stationary housing of the transducer and the other part to a movable diaphragm which constitutes a portion of one wall of the housing. The diaphragm is spring mounted to maintain a nominal value for the air gap. Alternating and fixed bias fluxes are induced with suitable magnetizing current coils to vary the air gap and drive the diaphragm.

The design of the diaphragm has proved most difficult. If the diaphragm is made rigid there is a problem in sealing the diaphragm's edges to the housing without interfering with its movement. By using a flexible diaphragm this problem is solved, but the diaphragm's amplitude of vibration falls off near its edges and the transducer becomes a very inefficient coupler. The relatively thin diaphragm is sensitive to hydrostatic pressures and requires the added complexity of a pressure compensating system to maintain a given air gap in the magnetic circuit.

An object of the present invention is, therefore, to provide an efficient, light-weight, high-power, variable reluctance, underwater sound transducer for low frequencies.

A further object of the invention is to provide a transducer wherein the entire rigid housing moves back and forth along an axis.

A further object of the invention is to provide a transducer which operates efficiently at great depths in water.

These and other objects and attendant advantages of the present invention will be best understood with reference to the following specification taken in conjunction with the accompanying drawings wherein:

FIG. 5 shows a typical array of a number of transducers such as that shown in FIGS 1 and 2.

Figure 1:
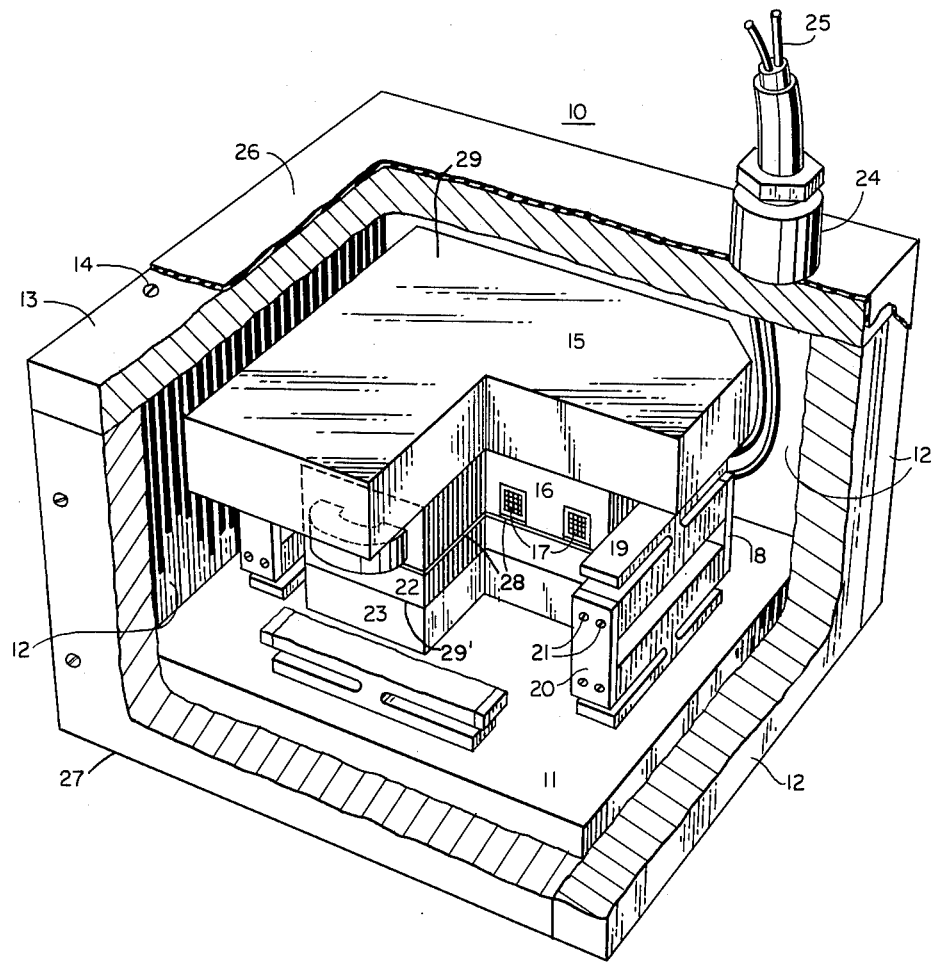
FIG. 1 is a perspective view, broken away to illustrate the internal construction of an embodiment of a transducer unit according to the present invention.

Referring to FIG. 1 there is shown a transducer unit 10. The outer portion of unit 10 consists of a rigid housing 27 comprising a base plate 11, side plates 12 and cover plate 13. These plates may be aluminum, magnesium or a similar material having sufficient strength. The plates may be formed separately, as shown, or several cast together forming a hollow cube, or box with one side open, over which a cover is placed in order to form a completely enclosed hollow unit. Their smaller dimension must be thick enough to avoid excessive deformation under pressure. The joints of the box are bonded with epoxy resin a common expedient in securing two joints together, and are further secured with screws 14. One model with a two piece cast magnesium housing 5⅛″ by 5⅛″ by 4½″ with cover and base plates ¾″ thick and side walls ⅜″ thick withstood hydrostatic pressures of 2200 p.s.i. (5500 ft. depth). Total weight of this transducer was 9 pounds. A transducer with thicker walls would be suitable for greater pressures.

Within the housing 27 of transducer unit 10 is a non-radiating, suspended mass 29, which is free from all walls and consists essentially of counterweight 15 on which is mounted a pole piece 16. The counterweight 15 is conveniently, but not necessarily, made from a denser material than the walls of the housing such as steel to provide a mass equal or comparable to that of the housing. Pole piece 16 is consolidated from laminated stampings of grain oriented silicon transformer steel. Windings 17 are prepared in a conventional manner and inserted in the slots provided in the assembled pole piece. The pole piece and windings are then potted in a suitable compound such as an epoxy resin or similar binding means, a well known expedient in the art.

The non-radiating mass 29 is suspended in the housing by means of four stiff springs 18 above a complementary mass 29′ so as to provide an approximate air gap 28 of about 0.005 inch. The springs have the form of the rectangular hoops with broad mounted feet. Other shapes may be employed. Springs 18 are made of a fine grade of spring steel, as for example SAE 6150. Fastening or holding means such as epoxy resin is used to bond the springs to base plate 11 and the suspended mass 29. For convenience the springs were made in three parts, top and bottom portions 19 and end straps 20 were assembled with screws 21 and copper brazed in a hydrogen furnace. A unit spring machined in this shape is superior but more expensive.

The complementary mass 29′ which is opposite suspended mass 29 is made up essentially of a pole piece 22 mounted on a spacer block 23 which in turn is mounted to base plate 11. The complementary pole piece is consolidated from laminated rectangular stampings of the same material and bonded in the same manner as pole piece 16. The spacer block is generally made of the same lightweight material as the housing. The thickness of the spacer block is chosen to provide the desired opening of the air gap 28 for a given set of laminations and a particular spring design. The structure is completed by bringing the coil leads 25 out of the housing through a conventional packing gland 24 and coating the entire unit with a thin layer of neoprene rubber 26 to protect the housing from the corrosive effects of seawater.

Figure 2:
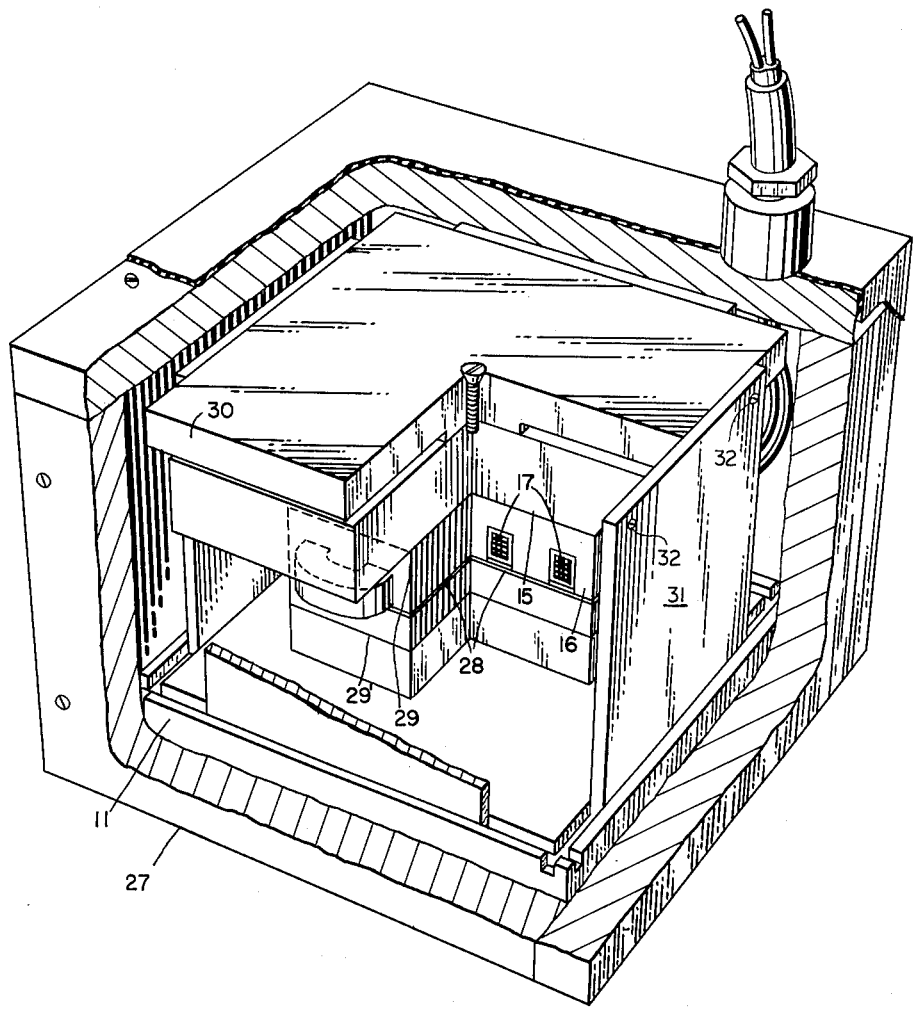
FIG. 2 shows a similar view to that shown in FIG. 1, with the springs being of different configuration.

The embodiment shown in FIG. 2 is similar to the FIG. 1 unit except for the spring structure. The non-radiating mass 29 in this model is attached to the center of a flexural spring plate 30. This spring plate is made of the same high quality spring steel previously mentioned. The spring plate is mounted at its edges to the housing by means of four rigid support plates 31. The parts are epoxy bonded and assembled by means of screws 32.

Figure 3:
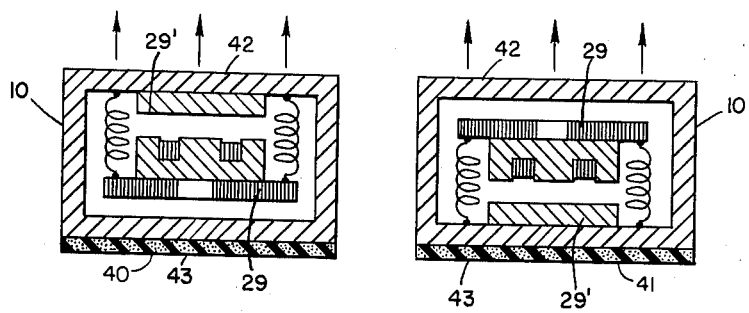
FIG. 3 is an illustrative sketch of a cut away view of two transducers operating in phase.

As shown in FIG. 3 the transducers are made in complementary pairs for greater efficiency of operation. For convenience the leads are sealed through opposite faces of the transducers and the transducers are placed side by side with their radiating faces in the same pair of parallel planes. Masses 29, the driving masses so to speak, are inverted with respect to one another. If the back wave is to be eliminated the transducers will have asymmetrically disposed layers 40 and 41 of a material which has an acoustic impedance greatly different than water, e.g. air cell foam rubber.

Figure 4:
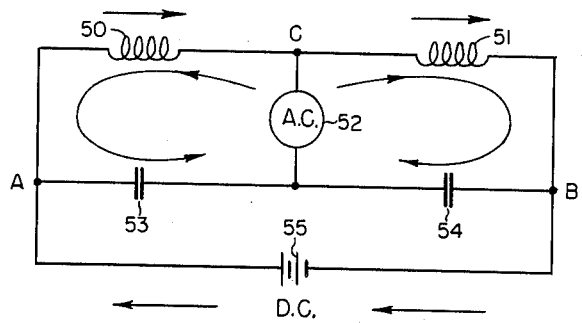
FIG. 4 shows a simplified schematic wiring diagram of the electrical circuit employed with the transducers in FIG. 3.

Due to the relative inversion of the transducers, both layers lie in a common plane to operate in phase if the respective coils are connected according to the electrical diagram shown in FIG. 4. The utilization of pairs of single-air-gap transducers, each having two similar rigid radiating faces used in the manner shown, makes it possible to connect the electrical coils in a push-pull arrangement that eliminates the need for bulky and costly chokes in the D.C. line. Single-air-gap devices with one radiating face cannot be used in this manner.

In vibration, the whole box housing 27 is displaced along an axis perpendicular to the air gap of the magnetic circuit. Acoustic energy is radiated from two opposite faces which move in a "piston-like" manner as opposed to a diaphragm or "drum-head" type of motion. Since the leading face 42 of the box generates a compressed acoustic wave and the trailing face 43 a rarified wave, the two beams of energy radiated by the transducer units 10 are 180° out of phase. Therefore, if one of a pair of transducer units 10 is rotated 180° with respect to the other and the pair is electrically connected in push-pull (so that one air gap is closing while the other is opening), the aligned faces 42 will be radiating in phase and no chokes will be required in the D.C. circuit.

FIG. 4 shows the electrical circuit for each complementary pair. The transducer coils 50 and 51 are connected in parallel to an A.C. driver source. The parallel paths include isolating capacitors 53 and 54. The capacitors have a large enough capacity to offer negligible impedance to signal current. By choosing the capacity to resonate with the inductance of the windings high efficiency may be achieved. The D.C. biasing source is connected to the coils in series relationship. Capacitors 53 and 54 prevent D.C. short circiuts through the A.C. paths.

As shown in FIG. 5 a plurality of pairs of transducers will generaly be combined to provide an array having a large surface as compared to a wavelength. In the experimental model shown the cubical transducers form a six by six array and provide a radiating area one wavelength square. Theoretical radiation impedance curves for square or circular pistons operating in water indicate that a solid radiating face having an area at least one wavelength square (where wavelength refers to the length of a sound wave in water at a given frequency) will be most effectively loaded by the acoustic medium. As the frequency decreases the wavelength increases. Therefore, the problem of providing effective transducers at low frequencies involves large radiating areas, high acoustic powers, and minimum weights to produce a resonant structure. In piezoelectric or magnetostrictive devices large amplitudes of displacement at low frequencies are obtained efficiently only at the expense of very large sections of active material vibrating in a longitudinal mode, or thin sections of small volume and thus very limited power-handing capacity vibrating in a flexural mode.

The units are held together by means of a frame 60 which is constructed of ordinary welded angle iron. A junction box 61 is welded to the top of the frame. The junction box provides space for splicing the leads to the various transducers. A three conductor cable carries power from the source to the array.

These conductors provide the paths from terminals A, B and C of the sources in FIG. 4 to the transducers in the array. The transducers are divided into two groups, the transducers in each group being connected exclusively to either terminal A or terminal B and both groups to terminal C. Transducers 50 and 51 represent the two groups. The transducers in each group may be connected either in series or parallel depending on the impedance of the sources 52 and 55.

Brackets 63 are attached to the rear of the frame in order to support sound reflecting means, such as a squashed tube reflector which may be used as a means of acoustically shielding area 64, the back side of the array. A squashed tube reflector is a grid of air-filled pipes of oval or rectangular cross-section. This type of reflector has a natural mechanical resonance which can be matched to the operating frequency of transducers. When the rear face 43 of the transducers themselves are covered with air cell rubber 40 also a means of acoustically shielding, as shown in FIG. 3, the reflector is not necessary.

The characterisics of one embodiment of the invention are given in the following table:

(1) Small size and lightweight for the power-handling capacity. (Dimensions=5⅛" x 5⅛" x 4½," weight=9 pounds, power=over 300 watts.)

(2) Piston-like vibration for efficient use of the radiating face area.

(3) Push-pull operation of paired elements for eliminating bulky isolating chokes in the polarizing circuit.

(4) Box-like structure for developing essentially solid radiating areas by close spacing.

(5) Insensitivity of air gap in magnetic circuit to hydrostatic pressure or depth of submersion.

(6) Versatility of design that permits changes in resonant frequency, power-handlng capacity, operation bandwidth, and effective coefficient of electromechanical coupling by varying the mechanical components of the resonant structure.

(7) Ability to realize relatively large vibratory displacements which are necessary for radiating high acoustic powers at low frequencies by combining an appropriate spring system with the masses of a transducer of small over-all dimensions.

The invention may be made otherwise than as specifically described above. It is preferred that square shape of the radiating faces be employed since they are easily combined to form an essentially solid radiation area which minimizes the imaginary component of the complex acoustic impedance. The transducer obviously could be designed to have a round or other shape of face. A 1.4 mass ratio between the non-radiating mass and housing 27 is employed in the embodiments, but other mass ratios may be employed. The operating bandwidth of these transducers may readily be varied by properly varying the masses.

In operation, an exciting alternating current is superimposed on a direct current flowing through coils 17, with the two currents flowing in the same direction during a given half cycle of A.C. The resultant magnetic pull tends to close air gap 28 by forcing the two masses together against the restraint of the springs 18 or 30. During the other half cycle, the two currents oppose each other and the stored energy in the springs overcomes the weakened magnetic pull and thus the air gap is widened. When the frequency of the existing current corresponds to the resonant frequency of the transducer, maximum amplitude of vibration for a given input is obtained.

Obviously many modifications and variations of the present invention are possible in the light of the above teachings. It is therefore to be understood that within the scope of the appended claims the invention may be practiced otherwise than as specifically described.

What is claimed is:

1. An array of transducers wherein each of said transducers comprises; a hollow rigid housing having first and second opposed walls, a non-radiating mass within said housing spring mounted on said first wall and spaced from said second wall, a magnetic circuit including first and second magnetic cores spaced to form a flux path with an air gap, said first core being mounted on said mass, said second core being mounted on said first wall, and a winding disposed on one of said cores; said transducers being divided into two equal groups with transducers in one group inverted with respect to those in the second group; a source of alternating current connected in parallel with said groups; and a source of direct biasing current connected in series with said groups.

2. An array according to claim 1 wherein said first wall of the transducers in said first group and said second wall of the transducers in said second group are disposed in a common plane.

3. An array according to claim 2 further including sound reflecting means adjacent to said housing walls disposed in said common plane.

4. An array according to claim 2 wherein the housing walls disposed in said common plane are covered with pressure release material.

5. The array of claim 1 wherein the non-radiating mass in each of said transducers is mounted by means of a plurality of springs extending between said non-radiating mass and said first wall, with said springs surrounding said cores.

References Cited by the Examiner
UNITED STATES PATENTS
1,604,693  10/1926  Hecht et al. _____ 340—8

CHESTER L. JUSTUS, *Primary Examiner.*

C. F. ROBERTS, G. M. FISHER, *Assistant Examiners.*